(12) United States Patent
Taniguchi et al.

(10) Patent No.: US 7,540,347 B2
(45) Date of Patent: Jun. 2, 2009

(54) EXHAUST SYSTEM FOR MOTORCYCLE

(75) Inventors: Masayuki Taniguchi, Saitama (JP);
Noriyoshi Tsutsui, Saitama (JP);
Nobutaka Wakita, Saitama (JP);
Hidetoshi Takamatsu, Saitama (JP);
Yuji Kashiwabara, Saitama (JP);
Shunichi Nakajima, Saitama (JP);
Tsuyoshi Arima, Saitama (JP);
Hirotaka Haze, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 242 days.

(21) Appl. No.: 11/540,714

(22) Filed: Oct. 2, 2006

(65) Prior Publication Data

US 2007/0107419 A1    May 17, 2007

(30) Foreign Application Priority Data

Sep. 30, 2005  (JP)  ............................. 2005-285937
Sep. 30, 2005  (JP)  ............................. 2005-287128

(51) Int. Cl.
    *B62D 61/02* (2006.01)
(52) U.S. Cl. .................... 180/219; 180/309; 181/275
(58) Field of Classification Search ................ 180/219, 180/309; 181/275
    See application file for complete search history.

(56) References Cited

U.S. PATENT DOCUMENTS

| | | | | |
|---|---|---|---|---|
| 4,809,800 A | * | 3/1989 | Suzuki ....................... | 180/219 |
| 5,271,477 A | * | 12/1993 | Gekka et al. ................ | 180/219 |
| 6,745,863 B2 | * | 6/2004 | Tsukui et al. ............... | 180/309 |
| 6,832,665 B2 | * | 12/2004 | Crombeen ................... | 181/275 |
| 7,290,388 B2 | * | 11/2007 | Kikuchi et al. ................ | 60/323 |
| 7,325,651 B2 | * | 2/2008 | Kikuchi et al. .............. | 181/237 |
| 2002/0153187 A1 | * | 10/2002 | Tsukui et al. ................ | 180/219 |

FOREIGN PATENT DOCUMENTS

| | | |
|---|---|---|
| JP | 2004-26007 A | 1/2004 |
| JP | 2004-345642 A | 12/2004 |

* cited by examiner

*Primary Examiner*—Paul N Dickson
*Assistant Examiner*—Tashiana Adams
(74) *Attorney, Agent, or Firm*—Birch, Stewart, Kolasch & Birch, LLP (57) ABSTRACT

In an exhaust system for a motorcycle in which an engine main body of a multi-cylinder engine has an oil pan on a lower portion thereof, and is mounted on a vehicle body with a plurality of expansion chambers being connected to a downstream side of an assembled portion of a plurality of exhaust pipes that extend out of the respective cylinders of the engine main body, respectively. The muffler includes a first expansion chamber that is connected to the assembled portion and the other expansion chambers that are the assembled portion are disposed on one side of the oil pan. The first continuous to the first expansion chamber. The respective exhaust pipes and expansion chamber is disposed on the other side of the oil pan with the other expansion chambers being disposed to the rear of the engine main body.

20 Claims, 9 Drawing Sheets

FIG. 9 ent application claims priority under 35 USC 119
EXHAUST SYSTEM FOR MOTORCYCLE

CROSS-REFERENCE TO RELATED APPLICATIONS

The present application claims priority under 35 USC 119 to Japanese Patent Application Nos. 2005-285937 filed on Sep. 30, 2005 and 2005-287128 filed on Sep. 30, 2005 the entire contents of which are hereby incorporated by reference.

BACKGROUND OF THE INVENTION

1. Field of the Invention

The present invention relates to an exhaust system for a motorcycle in which an engine main body of a multi-cylinder engine has an oil pan on a lower portion thereof, and is mounted on a vehicle body, and a muffler having a plurality of expansion chambers connected to a downstream side of an assembled portion of the plurality of exhaust pipes that extend out of the respective cylinders of the engine main body, respectively.

2. Description of Background Art

An exhaust system for a motorcycle is known wherein a muffler is connected to the exhaust pipes extending from the respective cylinders of the multi-cylinder engine. The muffler is disposed on the lower side of the engine main body. In the exhaust device of this type, for example, as disclosed in JP-A No. 2004-345642, the plurality of exhaust pipes are distributed to the right and left of an oil pan of the engine, and a cylindrical muffler that is substantially rectangular in section is disposed immediately below the oil pan.

However, in the related exhaust system of this type, because the muffler is disposed immediately below the oil pan of the engine, there is a case in which it is difficult to ensure the minimum ground clearance or the banking angle of the vehicle in the case of intending to ensure the capacity of the muffler.

SUMMARY OF THE INVENTION

The present invention has been made in view of the above circumstances. It is an object of an embodiment of the present invention to provide an exhaust system for a motorcycle which eliminates the above problem with the related art and is capable of sufficiently ensuring the minimum ground clearance and the banking angle of the motorcycle while ensuring the capacity of the muffler.

In order to address the above problem, according to a first feature of the present invention, there is provided an exhaust system for a motorcycle in which an engine main body of a multi-cylinder engine has an oil pan on a lower portion thereof, and is mounted on a vehicle body, and a muffler having a plurality of expansion chambers is connected to a downstream side of an assembled portion of a plurality of exhaust pipes that extend out of the respective cylinders of the engine main body, respectively, wherein the muffler includes a first expansion chamber that is connected to the assembled portion, and the other expansion chambers that are continuous to the first expansion chamber, the respective exhaust pipes and the assembled portion are disposed on one side of the oil pan with the first expansion chamber being disposed on the other side of the oil pan, and the other expansion chambers are disposed in the rear of the engine main body.

According to the configuration of the above first feature, the respective exhaust pipes and the assembled portion are disposed on one side of the oil pan, the first expansion chamber is disposed on the other side of the oil pan, and the other expansion chambers are disposed in the rear of the engine main body. With the above configuration, as compared with the related art in which the muffler is disposed immediately below the oil pan, the minimum ground clearance and the banking angle of the motorcycle can be sufficiently ensured while ensuring the capacity of the muffler. Also, since the heavy load that constitutes the exhaust system is concentrated below the engine, it is possible to lower the center of gravity of the motorcycle in the level, and concentrate the mass.

Also, according to an embodiment of the present invention, in addition to the configuration of the above first feature, the oil pan has an evaginated portion that is evaginated downwardly on the lower portion thereof, the respective exhaust pipes and the assembled portion are disposed at one side surface of the evaginated portion, and the first expansion chamber is disposed at the other side surface of the evaginated portion. With the above configuration, it is possible to increase the capacity of the first expansion chamber while the right and left weights are balanced with each other.

Also, according to an embodiment of the present invention, in addition to the configuration of the above second feature, one side of the evaginated portion is inclined so as to be positioned inward along the width direction of the vehicle toward the lower side, and the other side of the evaginated portion has a side plate portion that is substantially orthogonal to the bottom surface of the oil pan and extends vertically with a seam portion that extends from the upper end of the side plate portion toward the outer side so as to be substantially L-shaped. The exhaust pipes that are disposed on the outer side of the one side surface are connected to the first expansion chamber that is disposed on the outer side of the other side surface so as to position at least a part of the first expansion chamber on the lower side of the seam portion from the rear side of the oil pan. According to the above configuration, since the exhaust pipes that are high in the degree of freedom of the layout are disposed on one side of the evaginated portion, it is possible to ensure the capacity of the oil pan while preventing the lower portion of the engine main body from being upsized. Since the first expansion chamber is disposed on the outer side of the other side surface of the evaginated portion so that at least a part of the first expansion chamber is positioned on the lower side of the seam portion, it is possible to sufficiently ensure the banking angle when the motorcycle is inclined to a side where the first expansion chamber is arranged.

According to an embodiment of the present invention, a catalyst converter is disposed on the one side of the oil pan. According to the above configuration, the catalyst converter can be efficiently arranged in a narrow space on the one side of the oil pan.

In addition, according to an embodiment of the present invention, a vessel body that constitutes the first expansion chamber is substantially triangularly shaped in the cross-section and is disposed along a surface that is inclined obliquely upwardly towards the outer side in the vehicle front view, and the plurality of exhaust pipes are disposed along a surface that is inclined obliquely upwardly towards the outer side in the vehicle front view as opposed to the vessel body. According to the above configuration, it is possible to efficiently ensure the banking angle when the vehicle body is banked to the first expansion chamber side, and it is possible to efficiently ensure the banking angle when the vehicle body is banked to the exhaust pipe side. Also, the appearances of the vessel body that constitutes the first expansion chamber and the exhaust pipes are symmetrical, thereby making it possible to obtain the excellent appearance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

A first embodiment of the present invention will be described with reference to FIGS. 1 to 8. First, referring to FIG. 1, the vehicle body B of the motorcycle has a head pipe 5 at a front end thereof with a front fork 6 that pivotally supports a front wheel WF being supported by the head pipe 5 in a steering controllable fashion. Pivot frames 8 extend downwardly and are integrated with the rear portion of a pair of right and left main frames 7 that extend from the head pipe 5 toward the rear side. The front ends of the seat rails 9 extend rearwardly and upwardly and are coupled with the rear portions of both the main frames 7. The intermediate portions of the pivot frames 8 in the vertical direction are coupled with the front ends of the rear frames 10 that extend rearwardly and upwardly toward the lower side of the seat rails 9 with connecting members 11 being mutually connected between the seat rails 9 and the rear frames 10. In addition, the upper portions of engine hangers 12 that extend downwardly are coupled with the head pipe 5 and the front portions of the main frames 7.

Figure 1:
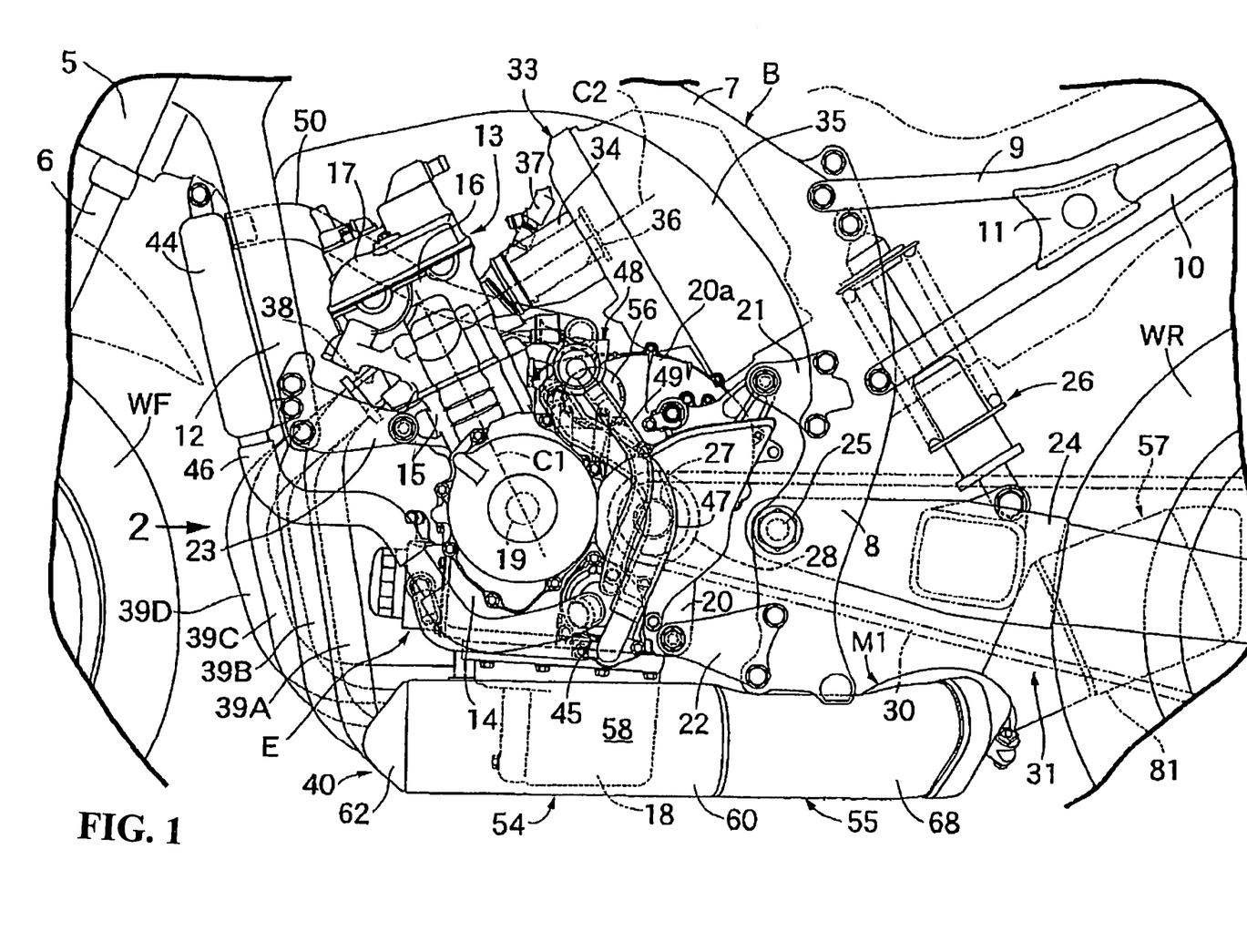
FIG. 1 is a side view showing the main portion of the motorcycle.

An engine main body 13 of a 4-cylinder engine E in which four cylinders are disposed in parallel is disposed on the lower side of the main frames 7 in the width direction of the vehicle body B. The engine main body 13 is supported by the intermediate portions and the lower portions of the pivot frames 8 in the vertical direction as well as the lower portions of the engine hangers 12.

The engine main body 13 includes a crank case 14, a cylinder block 15 that is coupled with the upper portion of the crank case 14, a cylinder head 16 that is coupled with the upper portion of the cylinder block 15, a head cover 17 that is coupled with the upper portion of the cylinder head 16, and an oil pan 18 that is coupled with the lower portion of the crank case 14. The engine main body 13 is mounted on the vehicle body B in a position wherein a cylinder axial line C1 is inclined forwardly and upwardly.

A crank shaft 19 having an axial line that extends in the width direction of the vehicle body B is rotatably supported by the crank case 14. A transmission case 20 that houses a transmission (not shown) that changes the rotating output of the crank shaft 19 is positioned on the rear portion of the cylinder block 15 in a state where the transmission case 20 is mounted on the motorcycle, and is integrated with the crank case 14.

Brackets 21 and 22 are fastened to the intermediate portions and the lower portions of the pivot frames 8 in the vertical direction, and the upper portions and the lower portions of the transmission case 20 are fastened to the brackets 21 and 22. Also, the brackets 23 are fastened to the lower portions of the engine hangers 12, and the front end of the cylinder block 15 is fastened to the brackets 23.

A rear wheel WR is pivotally supported by the rear portion of a swing arm 24, and the front portion of the swing arm 24 is slidably supported by the pivot frames 8 between the brackets 21 and 22 through a spindle 25. A reaction unit 26 is disposed between the rear portions of the main frames 7 and the swing arm 24.

Also, the rotating power of an output shaft 27 of the transmission is transmitted to the rear wheel WR through chain transmission means 31 including a drive sprocket 28 that is fixed to the output shaft 27, a driven sprocket (not shown) that is fixed to the axle of the rear wheel WR, and an endless chain 30 wound on the drive sprocket 28 and the driven sprocket.

Intake ports (not shown) that are disposed in parallel at given intervals in the width direction of the vehicle body B are opened on the rear surface of the cylinder head 16 in the respective cylinders. The respective intake ports are connected with an intake device 33.

The intake device 33 includes throttle bodies 34 that are connected to the respective intake ports, individually, and an air cleaner 35 that is connected commonly with the upstream ends of the throttle bodies 34. The intake axial lines C2 of the intake passages 36 that are formed within the respective throttle bodies 34 are substantially orthogonal to the cylinder axial lines C1 that are inclined forwardly and upwardly and extend rearwardly and upwardly. Moreover, fuel injection valves 37 corresponding to the respective cylinders, individually, are fitted to the respective throttle bodies 34.

Exhaust ports 38 that are disposed in parallel at given intervals in the width direction of the vehicle body B are opened on the front surface of the cylinder head 16 in the respective cylinders. The respective exhaust ports 38 are connected with an exhaust device 40 having four exhaust pipes 39A, 39B, 39C, and 39D that have the upstream ends individually connected to the respective exhaust ports 38. The exhaust device 40 extends toward the right side of the rear wheel WR through the right side, the rear side, and the left side of the oil pan 18 on the lower portion of the engine main body 13.

The radiator 44 is disposed in front of the engine hanger 12, and the radiator 44 is supported by the head pipe 5 and the engine hangers 12. On the other hand, a water pump 45 that is rotationally driven by transmission power from the crank shaft 19 is fitted to the left side surface of the transmission case 20, and cooling water that has been cooled by the radiator 44 is sucked into the water pump 45 through a first cooling water hose 46.

In addition, the cylinder block 15 and the cylinder head 16 are equipped with a water jacket (not shown). A cooling water that is discharged from the water pump 45 is supplied to the water jacket within the cylinder block 15 through a second cooling water hose 47. Also, a path of the cooling water that is exhausted from the water jacket within the cylinder head 16 is switched over by a thermostat 48 according to the temperature of the cooling water. That is, a rate of the water quantity that is returned to the water pump 45 to the water quantity that is supplied to the radiator 44 in the cooling water that is exhausted from the water jacket within the cylinder head 16 is adjusted by the thermostat 48. The thermostat 48 and the water pump 45 are connected by a third cooling water hose 49 that guides the cooling water which is returned to the water pump 45 side, and the thermostat 48 and the radiator 44 are connected by a fourth cooling water hose 50 that is supplied to the radiator 44 side.

Figure 2:
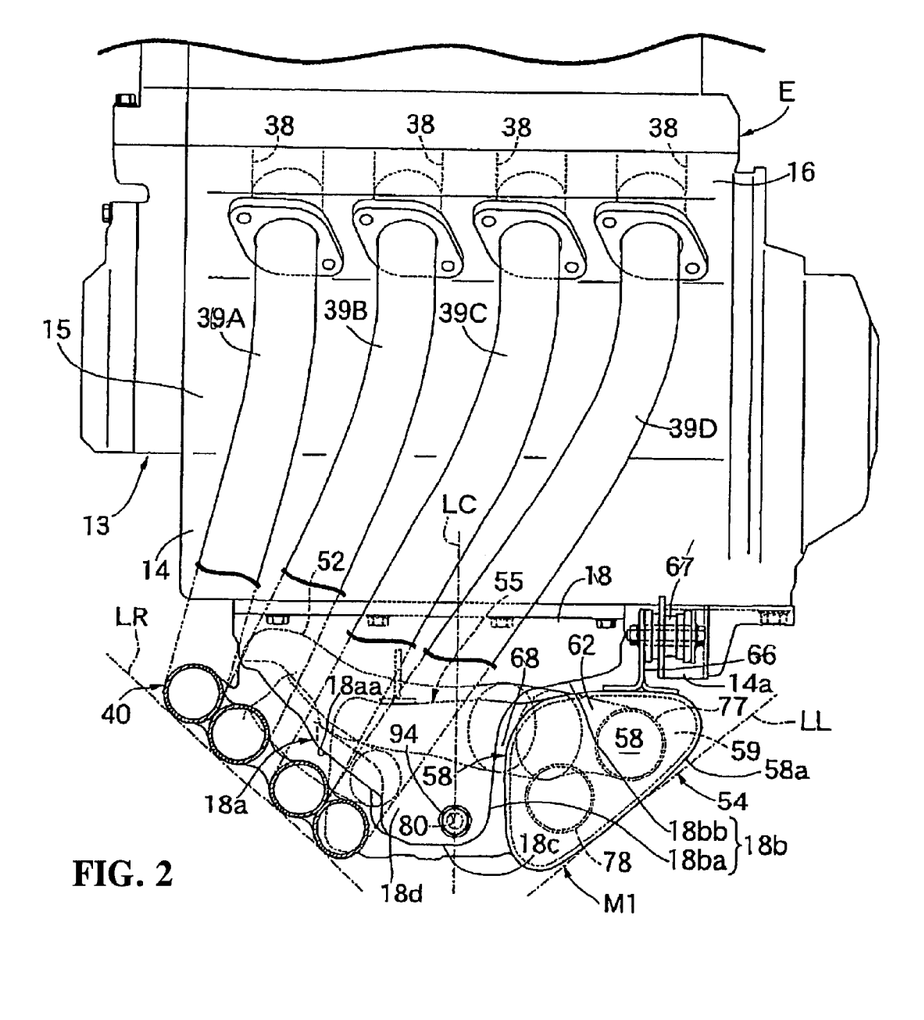
FIG. 2 is a perspective view of FIG. 1.
Figure 3:
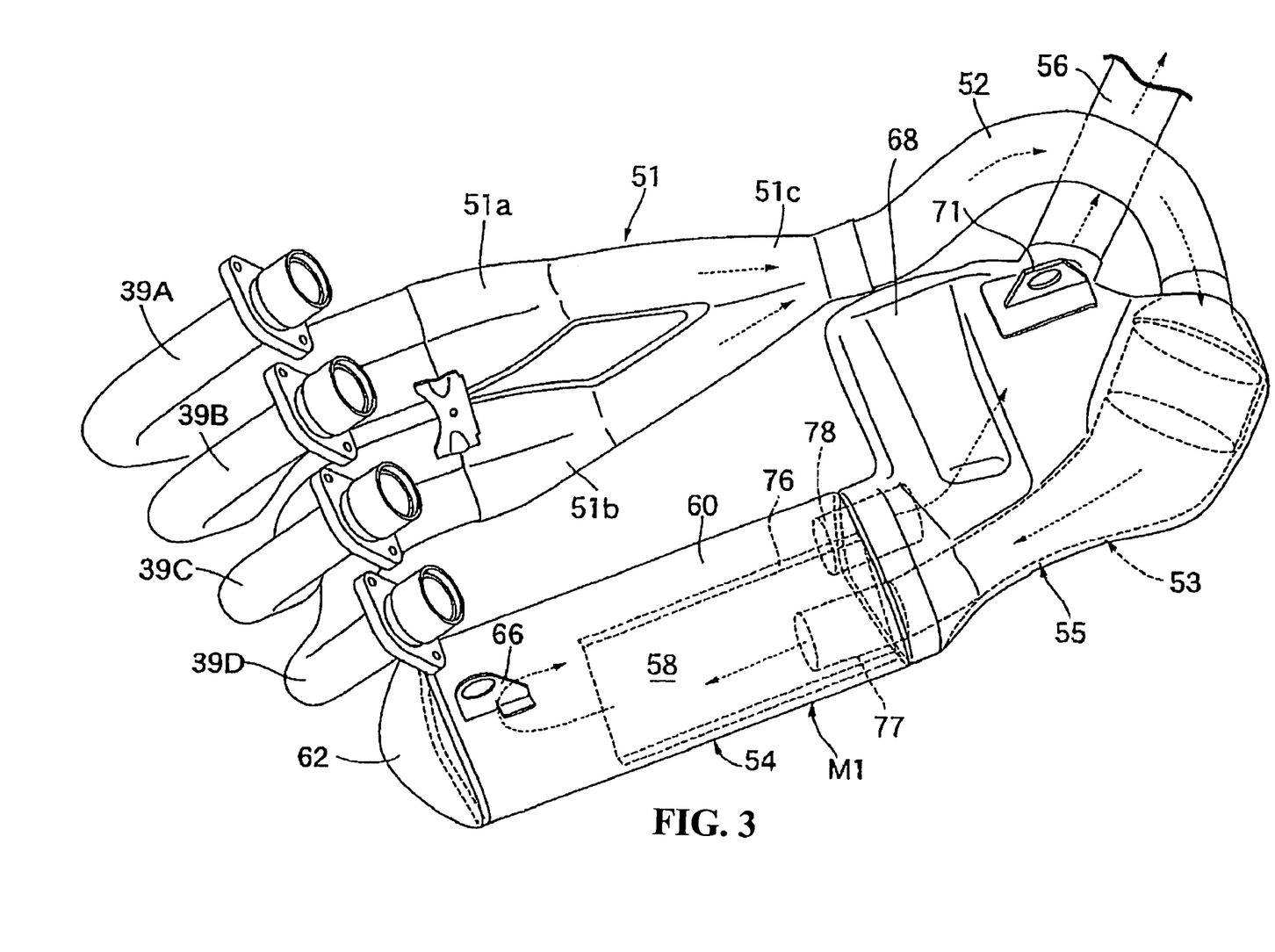
FIG. 3 is a perspective view showing a part of the exhaust device.
Figure 4:
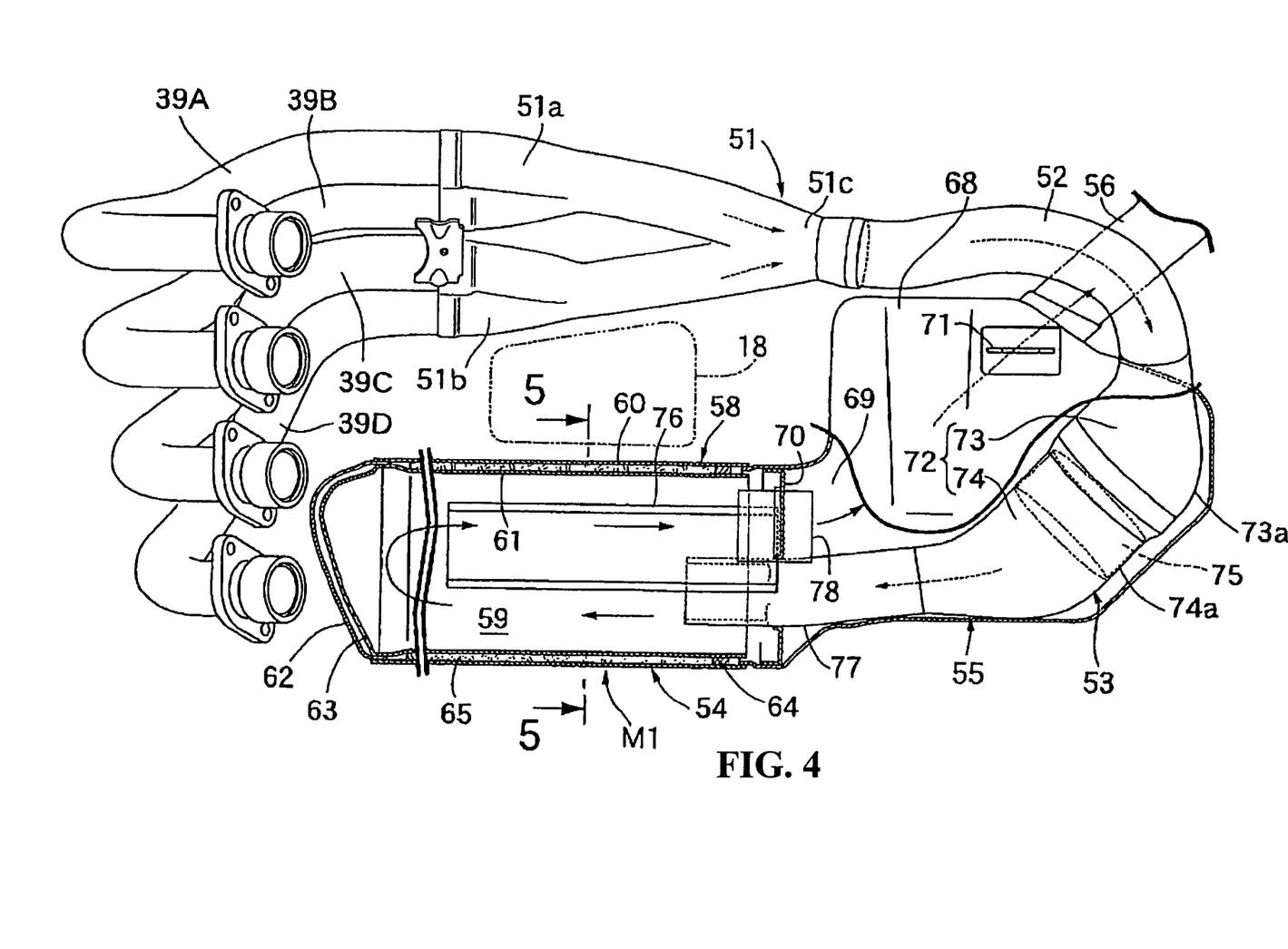
FIG. 4 is a partially cutaway plan view of the exhaust device shown in FIG. 3.

Referring to FIGS. 2 to 4, the exhaust device 40 includes four exhaust pipes 39A to 39D that have the upstream ends individually connected to the respective exhaust ports 38 on the front surface of the cylinder head 16, an assembly exhaust pipe 51 as an assembled portion which is connected commonly to the downstream ends of the exhaust pipes 39A to 39D, a first connecting pipe 52 having an upstream end connected to the downstream end of the assembly exhaust pipe 51, a catalyst converter 53 having the upstream end connected to the downstream end of the first connecting pipe 52, and a muffler M1 that is connected to the downstream end of the catalyst converter 53. The muffler M1 includes a first muffling portion 54 having a first expansion chamber 59, a second muffling portion 55 having a second expansion chamber 69, into which an exhaust gas is introduced from the first muffling portion 54, a second connecting pipe 56 that introduces the exhaust gas from the second muffling portion 55, and a third muffling portion 57 having a third expansion chamber 79 (refer to FIG. 7) and having the upstream end connected to the downstream end of the second connecting pipe 56.

The four exhaust pipes 39A to 39D that extend downwardly from the front surface of the cylinder head 16 are curved so as to be disposed on one side (right side in this embodiment) of the oil pan 18. Also, the assembly exhaust pipe 51 is substantially Y-shaped by integrating a first branch pipe portion 51a that connects the downstream ends of the two adjacent exhaust pipes 39A and 39B in the four exhaust pipes 39A to 39D, a second branch pipe portion 51b that connects the downstream ends of the two remaining exhaust pipes 39C and 39D in the four exhaust pipes 39A to 39D, and an assembly pipe portion 51c that commonly the downstream ends of the first and second branch pipe portions 51a and 51b. The assembly exhaust pipe 51 is disposed on one side of the oil pan 18.

On the other hand, the vessel body 58 of the first muffling portion 54 is structured in a double pipe configuration in association with an outer cylinder 60 that extends anteroposteriorly of the motorcycle, an inner cylinder 61 that is disposed coaxially within the outer cylinder 60, an outer end plate 62 that is configured so as to be swelled forward and coupled to the front end of the outer cylinder 60, and an inner end plate 63 that is configured so as to be swelled forward, disposed on the inner side of the outer end plate 62, and coupled to the front end of the inner cylinder 61. The inner end plate 63 is welded to the outer end plate 62, and a ring spacer 64 and glass wool 65 are interposed between the outer cylinder 60 and the inner cylinder 61.

The first expansion chamber 59 that is located on the lower side of the vehicle body B is formed within the inner cylinder 61 of the vessel body 58 and the inner end plate 63. Since the vessel body 58 is disposed on the other side of the oil pan 18 (left side in this embodiment), the first expansion chamber 59 is disposed on the other side (left side in this embodiment) of the oil pan 18.

Figure 5:
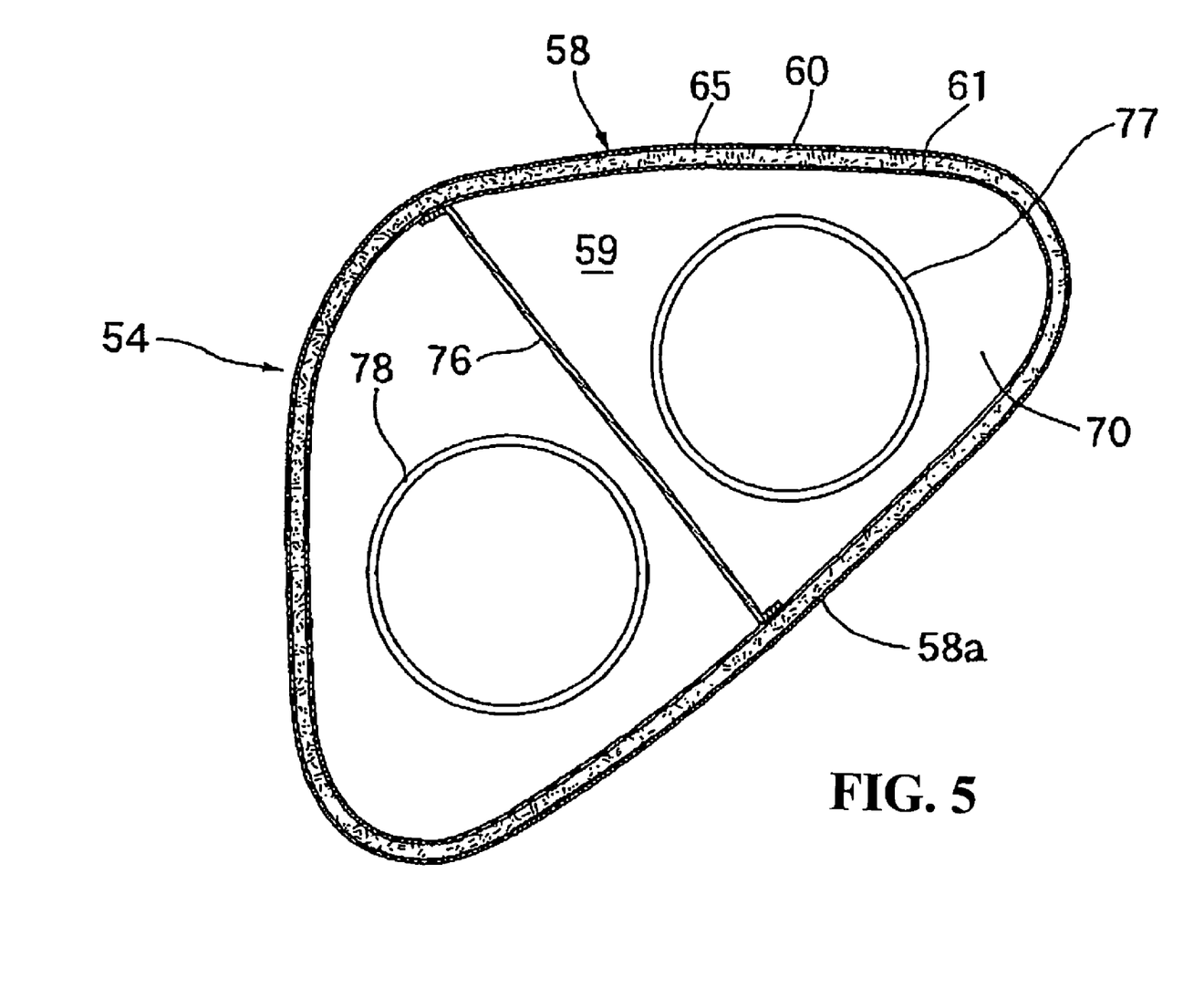
FIG. 5 is a cross-sectional view taken along a line 5-5 of FIG. 4.

Moreover, the sectional configuration of the vessel body 58 that forms the first expansion chamber 59 is triangularly configured in the cross-section with an oblique surface 58a that is the inner position along the width direction of the vehicle body B toward the lower side as the outer surface as shown in FIG. 5.

A support plate 66 is fixed to the front upper surface of the outer cylinder 60 in the vessel body 58 of the first muffling portion 54, and the support plate 66 is supported to a support portion 14a disposed on the crank case 14 of the engine main body 13 through a mount rubber 67.

A vessel body 68 of the second muffling portion 55 is coupled with a rear end of the outer cylinder 60 in the first muffling portion 54 so as to extend around the rear side of the oil pan 18. A second expansion chamber 69 continuous to the first expansion chamber 59 is formed within the vessel body 68, and the second expansion chamber 69 is disposed between the oil pan 18 and the rear wheel WR on the rear side of the engine main body 13.

Moreover, the outer periphery of an isolation board 70 for isolating the first and second expansion chambers 59 and 69 from each other is fixed to the inner surface of the end of the first muffling portion 54 side in the vessel body 68 of the second muffling portion 55. Also, the support plate 71 is fixed to the upper surface of the vessel body 68 of the second muffling portion 55, and the support plate 71 is supported to the vehicle body B through a mount rubber not shown.

The majority of a casing 72 of the catalyst converter 53 is housed in the second expansion chamber 69. The casing 72 is formed by coupling an upstream end of a second pipe member 74 having a larger diameter portion 74a on an upstream half side with an downstream end of a first pipe member 73 having a larger diameter portion 73a on a downstream half side. The larger diameter portion 74a of the second pipe member 74 is filled with a catalyst 75.

In addition, the upstream end of the first pipe member 73 air-tightly penetrates the vessel body 58 of the second muffling portion 55 and projects from the right side. The downstream end of the first connecting pipe 52 having an upstream end connected to the assembly pipe portion 51c of the assembly exhaust pipe 51 is connected to the upstream end of the first pipe member 73, that is, the upstream end of the catalyst converter 53.

A separator 76 that separates the first expansion chamber 59 into right and left parts on a portion near the second expansion chamber 69 is fixed onto a portion of the isolation plate 70 side of the inner cylinder 61 in the vessel body 58 of the first muffling portion 54. A first conduit pipe 77 having the downstream end communicating with the first expansion chamber 59 on the left side of the separator 76 air-tightly penetrates the isolation plate 70, and the upstream end of the first conduit pipe 77 is connected to the downstream end of the casing 72 of the catalyst converter 53, that is, the downstream end of the second pipe member 74.

More specifically, the four exhaust pipes 39A to 39D that are disposed on one side of the oil pan 18 are connected to the first expansion chamber 59 that is disposed on the other side of the oil pan 18 through the assembly exhaust pipe 51, the first connecting pipe 52, the catalyst converter 53, and the first conduit pipe 77 from the rear side of the oil pan 18.

A second conduit pipe 78 having the upstream end communicating with the first expansion chamber 59 on the right side of the separator 76 air-tightly penetrates the isolation plate 70, and the downstream end of the second conduit pipe 78 is opened to the second expansion chamber 69. That is, the exhaust gas within the first expansion chamber 59 is introduced into the second expansion chamber 69 through the second conduit pipe 78.

Figure 6:
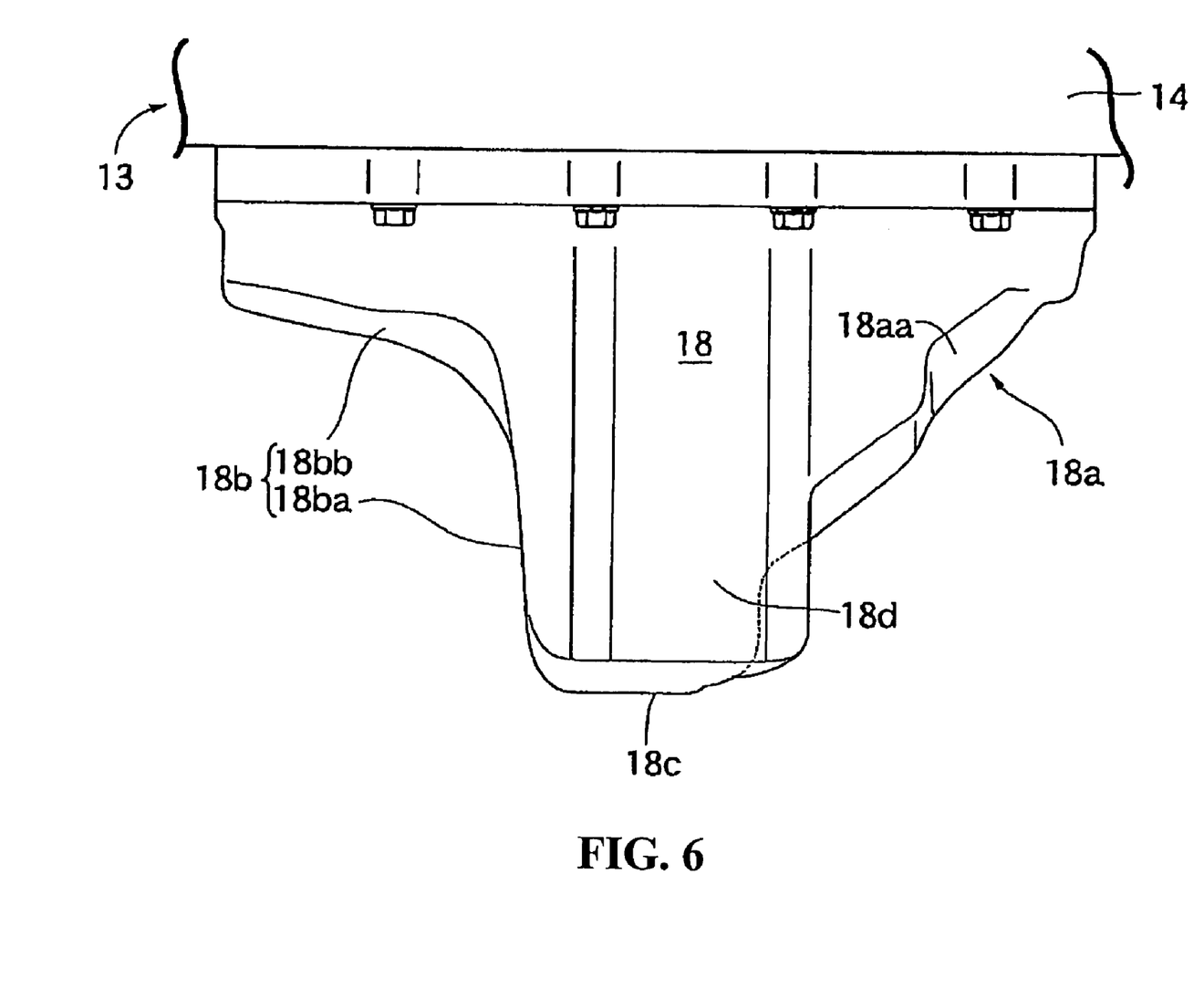
FIG. 6 is a back view of the oil pan taken from an opposite side of FIG. 2.

Referring to FIGS. 2 and 6, the oil pan 18 has an evaginated portion 18d that is evaginated downwardly on a lower portion, and one first side surface 18a of both left and right side surfaces of the evaginated portion 18d is inclined to be positioned inward along the width direction of the vehicle body B toward the lower side. The four exhaust pipes 39A to 39D that face the first side surface 18a are displaced vertically so as to be arranged along the inclined first side surface 18a.

Further, the intermediate portion 18aa arranged along the vertical direction of the first side surface 18a is inclined to be positioned inward in the width direction of the vehicle body B toward the rear side as clearly shown in FIG. 6.

The other second side surface 18b of both left and right side surfaces of the evaginated portion 18d has a side plate portion 18ba that is substantially orthogonal to a bottom surface 18c of the oil pan 18 and extends vertically. A seam portion 18bb extends from an upper end of the side plate portion 18ba toward the outer side so as to be substantially L-shaped.

On one side (right side in this embodiment) of the evaginated portion 18d are disposed the respective exhaust pipes 39A to 39D, the assembly exhaust pipe 51, and the first muffling portion 54, that is, the first expansion chamber 59. At least a part, the half in this embodiment, of the first muffling portion 54, that is, the first expansion chamber 59 is positioned on the lower side of the seam portion 18bb, and is arranged on the outer side of the second side surface 18b, that is, on the other side (left side in this embodiment) of the evaginated portion 18d.

As clearly shown in FIG. 2, the vessel body 58 that is substantially triangularly shaped in the cross-section to form the first expansion chamber 59 is arranged along a plane LL that is inclined obliquely upwardly toward the outer side in the vehicle front view. The plurality of exhaust pipes 39A to 39D are arranged along a plane LR that is inclined obliquely upwardly toward the outer side in the vehicle front view as opposed to the vessel body 58. Both of the planes LL and LR are symmetrically arranged with respect to the vehicle center line LC.

In addition, the majority of support portion 14a is disposed in the crank case 14 so as to support the support plate 66 which is fixed onto the front upper surface of the outer cylinder 60 in the vessel body 58 of the first muffling portion 54. The majority of support portion 14a is disposed in the crank case 14 so as to be positioned above an extension of the lower surface of the seam portion 18bb on the second side surface 18b toward the outer side. This structure of the support portion 14a makes it possible to support the vessel body 58 while sufficiently ensuring the sectional area of the first expansion chamber 59.

In addition, an oil exhaust opening 80 is defined between the respective exhaust pipes 39A to 39D and the first muffling portion 54, that is, the first expansion chamber 59 in front of the oil pan 18, and the opening 80 is closed by a detachably attachable cap 94 such as a bolt.

Figure 7:
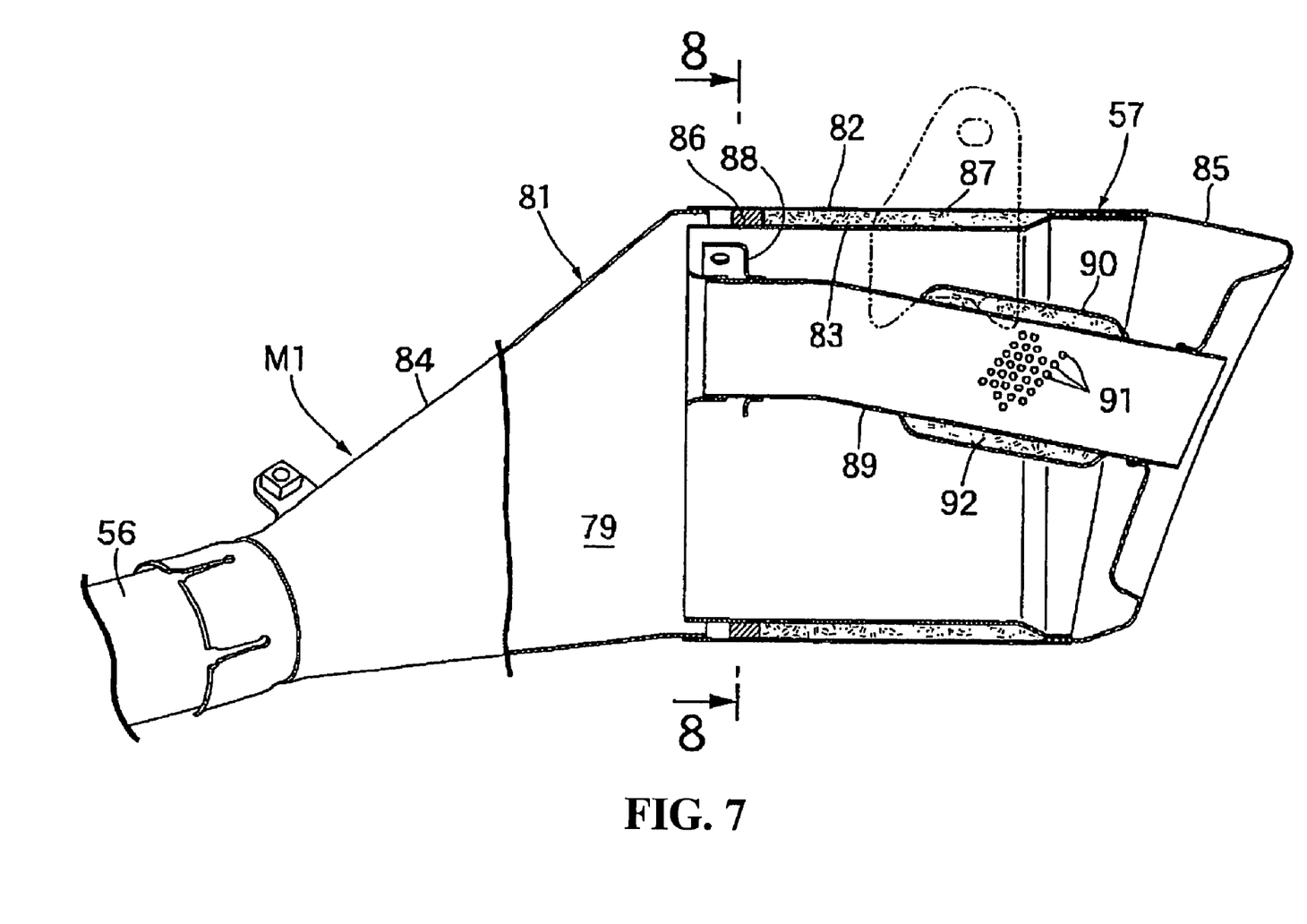
FIG. 7 is a longitudinal sectional side view showing the remaining portion of the exhaust device.
Figure 8:
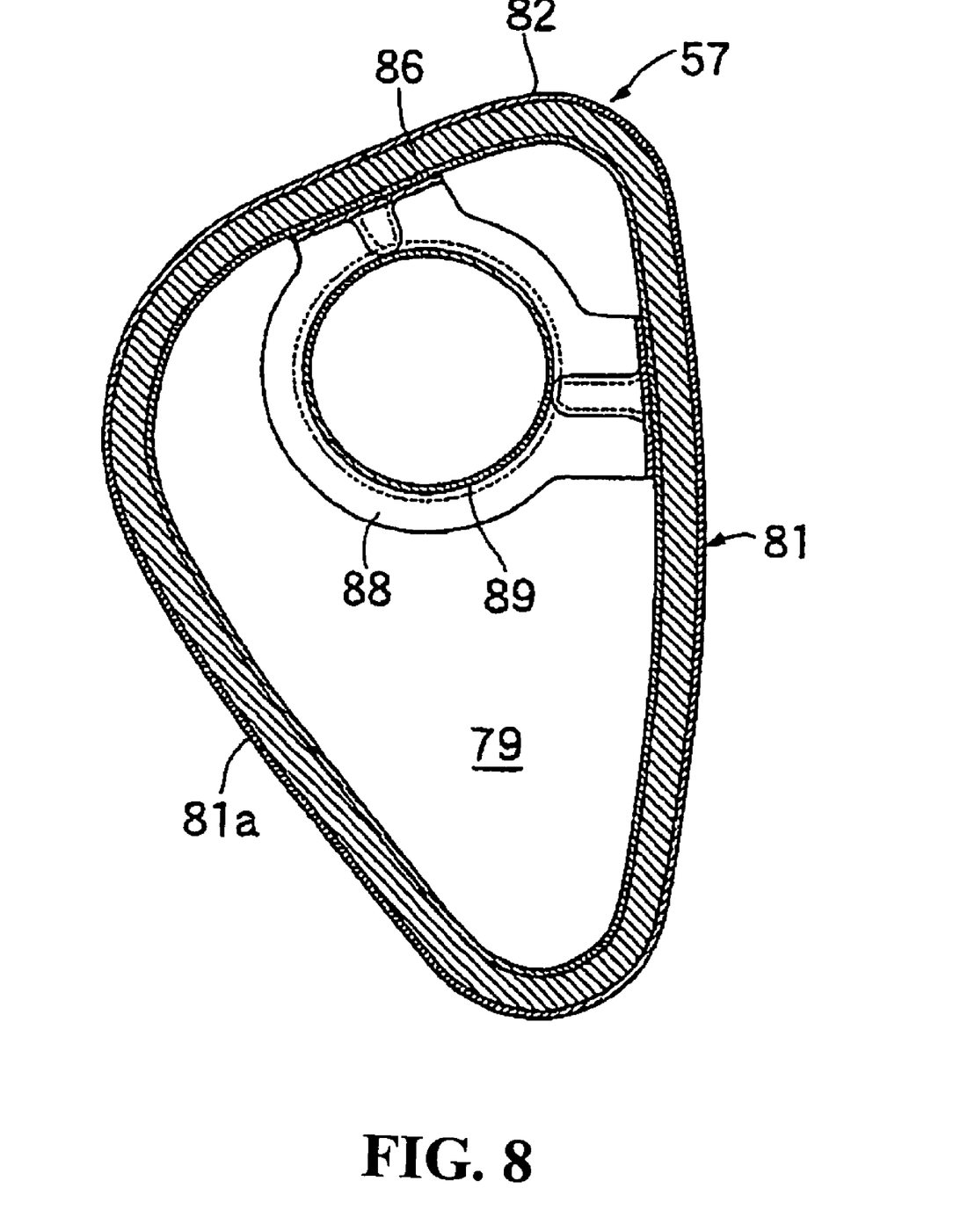
FIG. 8 is a cross-sectional view taken along a line 8-8 of FIG. 7.

Referring to FIGS. 7 and 8, a vessel body 81 of the third muffling portion 57 includes an outer cylinder 82 that extends anteroposteriorly of motorcycle, an inner cylinder 83 is disposed coaxially within the outer cylinder 82. A taper pipe 82 includes a smaller diameter toward the forward direction and is coupled with the front end of the outer cylinder 82. A tail plate 85 is coupled with the rear end of the inner cylinder 83 as well as the rear end of the outer cylinder 82 and closes the rear ends of the outer cylinder 82 and the inner cylinder 83.

The vessel body 81 is disposed in the rear of the engine main body 13 and on the right side of the rear wheel WR. A third expansion chamber 79 is defined within the vessel body 81. More specifically, the third expansion chamber 79 is also disposed in the rear of the engine main body 13 and on the right side of the rear wheel WR.

A ring-shaped spacer 86 and a glass wool 87 are interposed between the outer cylinder 82 and the inner cylinder 83. The taper pipe 84 of the vessel body 81 is connected with the lower end of the second connecting pipe 56. In addition, a support member 88 is fixed onto the inner surface of the front end of the inner cylinder 83. The front end of an atmosphere emission pipe 89 air-tightly penetrates the tail plate 85 so as to open the third expansion chamber 79 to the atmosphere and is supported by the support member 88. The rear portion of the atmosphere emission tube 89 is welded to the tail plate 85. In addition, the intermediate portion of the atmosphere emission tube 89 is covered with a sound absorbing cylinder 90, and a large number of small openings 91 are defined in the atmosphere emission pipe 89 on a portion corresponding to the sound absorbing cylinder 90. A space between the sound absorbing cylinder 90 and the atmosphere emission pipe 89 is filled with glass wool 92.

As clearly shown in FIG. 8, the sectional configuration of the vessel body 81 that forms the third expansion chamber 79 is triangularly shaped with an oblique surface 81a that is the inner position along the width direction of the vehicle body B toward the lower side as the outer surface.

Hereinafter, the operation of the first embodiment will be described. The first expansion chamber 59 is disposed on the side of the oil pan 18. Even in the case of sufficiently ensuring the capacity of the first expansion chamber 59, the lower portion of the engine E including the exhaust device 40 can be prevented from being enlarged anteroposteriorly. Moreover, the four exhaust pipes 39A to 39D that are disposed on one side (right side in this embodiment) of the oil pan 18 are connected to the first expansion chamber 59 that is disposed on the other side (left side in this embodiment) of the oil pan 18, from the back side of the oil pan 18. As a result, the structural members of the exhaust device 40 are not disposed on the lower side of the oil pan 18, thereby making it possible to prevent a position at which the engine main body 13 is mounted from being at an upper position so as to lower the center of gravity in the level.

Moreover, the muffler M1 includes the first expansion chamber 59 that is connected to the assembly exhaust pipe 51 with the second and third expansion chambers 69 and 79 being continuous to the first expansion chamber 59. The respective exhaust pipes 39A to 39D and the exhaust assembly pipe 51 are disposed on one side (right side) of the oil pan 18. The first expansion chamber 59 is disposed on the other side (left side) of the oil pan 18. The second and third expansion chambers 69 and 79 are disposed in the rear of the engine main body 13. With the above configuration, as compared with the related art in which the muffler is disposed immediately below the oil pan 18, the minimum ground clearance and the bank angle of the motorcycle can be sufficiently ensured while ensuring the entire capacity of the expansion chambers 59, 69, and 79. In addition, the lower portion of the engine E including the exhaust system 40 can be compactly constituted. Further, since the heavy load that constitutes the exhaust system 40 is concentrated below the engine E, it is possible to lower the center of gravity of the motorcycle in the level, and concentrate the mass.

Further, it is possible to ensure a sufficient capacity as the entire expansion chamber even if the capacity of the third expansion chamber 79 is reduced as much as possible. Therefore, the third expansion chamber 79, that is, the third muffling portion 57 is formed compactly so as not to extend from the rear wheel WR to the back side, thereby making it possible to make the entire motorcycle compact and concentrate the weight mass for contributing to an improvement in the motion performance of the motorcycle.

The oil pan 18 has an evaginated portion 18d that is evaginated downwardly on the lower portion thereof, the respective exhaust pipes 39A to 39D and the assembly exhaust pipe 51, and the first expansion chamber 59 are disposed at both sides of the evaginated portion 18d. With the above configuration, it is possible to increase the capacity of the first expansion chamber 59 while the right and left weights are balanced with each other.

The first side surface 18a, one (right side) of both the right and left side surfaces of the evaginated portion 18d of the oil pan 18, is inclined so as to be positioned inwardly in the width direction of the vehicle body (B) toward the lower side. The exhaust pipes 39A to 39D that are small in the passage sectional area and high in the degree of freedom of the layout are disposed on the outer side of the first side surface 18a. As a result, the capacity of the oil pan 18 can be ensured while preventing a lower portion of the engine E from being upsized.

The second side surface 18b, that is the other (left side) of both left and right side surfaces of the evaginated portion 18d of the oil pan 18, has the side plate portion 18ba that is substantially orthogonal to the bottom surface 18c of the oil pan 18 and extends vertically. The seam portion 18bb extends from the upper end of the side plate portion 18ba toward the outer side so as to be substantially L-shaped. At least a part of the first muffling portion 54 that constitutes the first expansion chamber 59 is positioned on the lower side of the seam portion 18bb, and is arranged on the outer side of the second side surface 18b. As a result, it is possible to sufficiently ensure the banking angle when the motorcycle is banked toward the side (left side) where the first expansion chamber 59 is arranged. Further, the sectional configuration of the vessel body 58 of the first muffling portion 54 is triangularly shaped with the oblique surface 58a that is the inner position along the width direction of the vehicle body B toward the lower side as the outer surface. As a result, it is easier to ensure the banking angle when the motorcycle is banked to the left side.

The vessel body 58 that constitutes the first expansion chamber 59 is substantially triangularly shaped in cross-section and is disposed along the plane LL that is inclined obliquely upward toward the outer side in the vehicle front view. The plurality of exhaust pipes 39A to 39D are disposed along a plane LR that is inclined obliquely upwardly toward the outer side in the vehicle front view as opposed to the vessel body. As a result, it is possible to efficiently ensure the banking angle when the vehicle body is banked to the first expansion chamber 59 side, and it is possible to efficiently ensure the banking angle when the vehicle body is banked to the exhaust pipes 39A to 39D side. The appearances of the vessel body 58 that constitutes the first expansion chamber 59 and the exhaust pipes 39A to 39D are symmetrical, thereby making it possible to obtain an excellent appearance.

The four exhaust ports 38 are disposed on the front surface of the cylinder head 16 in the engine main body 13 so as to be aligned in the width direction of the vehicle body B. The four exhaust pipes 39A to 39D that are connected to the exhaust ports 38, individually, are disposed on the outer side of the first side surface 18a and extend rearwardly. The downstream ends of the exhaust pipes 39A to 39D are connected commonly to the first expansion chamber 59 that is disposed on the outer side of the second side surface 18b of the oil pan 18. With the above configuration, in the multi-cylinder engine E in which plural cylinders are aligned in the width direction of the vehicle body B, the plurality of exhaust pipes 39A to 39D and the first expansion chamber 59 are divided to the left or right side of the oil pan 18, thereby making it possible to equalize the weight balance in the lateral direction of the engine E.

The exhaust pipes 39A to 39D are displaced vertically along the first side surface 18a of the oil pan 18, thereby making it possible to sufficiently ensure the banking angle when the motorcycle is banked toward the side where the respective exhaust pipes 39A to 39D are arranged. Moreover, the sectional configuration of the vessel body 81 of the third muffling portion 57 that forms the third expansion chamber 79 is triangularly shaped with an oblique surface 81a that is the inner position along the width direction of the vehicle body B toward the lower side as the outer surface. As a result, when the configuration of the first side surface 18a of the oil pan 18 and the arrangement of the respective exhaust pipes 39A to 39D are determined so as to ensure the banking angle when the motorcycle is banked to the side where the respective exhaust pipes 39A to 39D are arranged, more specifically, to the right side. The third muffling portion 57 is not an obstacle to securing of the banking angle.

The intermediate portion 18aa arranged along the vertical direction of the first side surface 18a, which is a side where the respective exhaust pipes 39A to 39D are arranged, is inclined to be positioned inwardly in the width direction of the vehicle body B toward the rear side. As a result, when the plurality of exhaust pipes 39A to 39D are gathered on the rear side of the oil pan 18, the sectional configuration of the gathered portion is capable of being an approximate circle, thereby improving the exhaust efficiency. Further, since the gathered portion can be arranged such that the lower portion of the engine E does not extend towards the outer side even in a state where the sectional area of the gathered portion is maintained, it is possible to ensure the banking angle when the motorcycle is banked toward the side where the exhaust pipes 39A to 39D are disposed.

Moreover, the oil exhaust opening 80 is defined on the front surface of the oil pan 18 between the respective exhaust pipes 39A to 39D and the first muffling portion 54. With the above structure, an access due to the tool is facilitated at the time of interchanging the oil of the oil pan 18, and the structural members of the motorcycle are not disposed on the lower side of the opening 80. As a result, it is possible to enhance the maintenance of the vehicle by making it possible to gain access to the oil at the time of changing the oil as much as possible.

Figure 9:
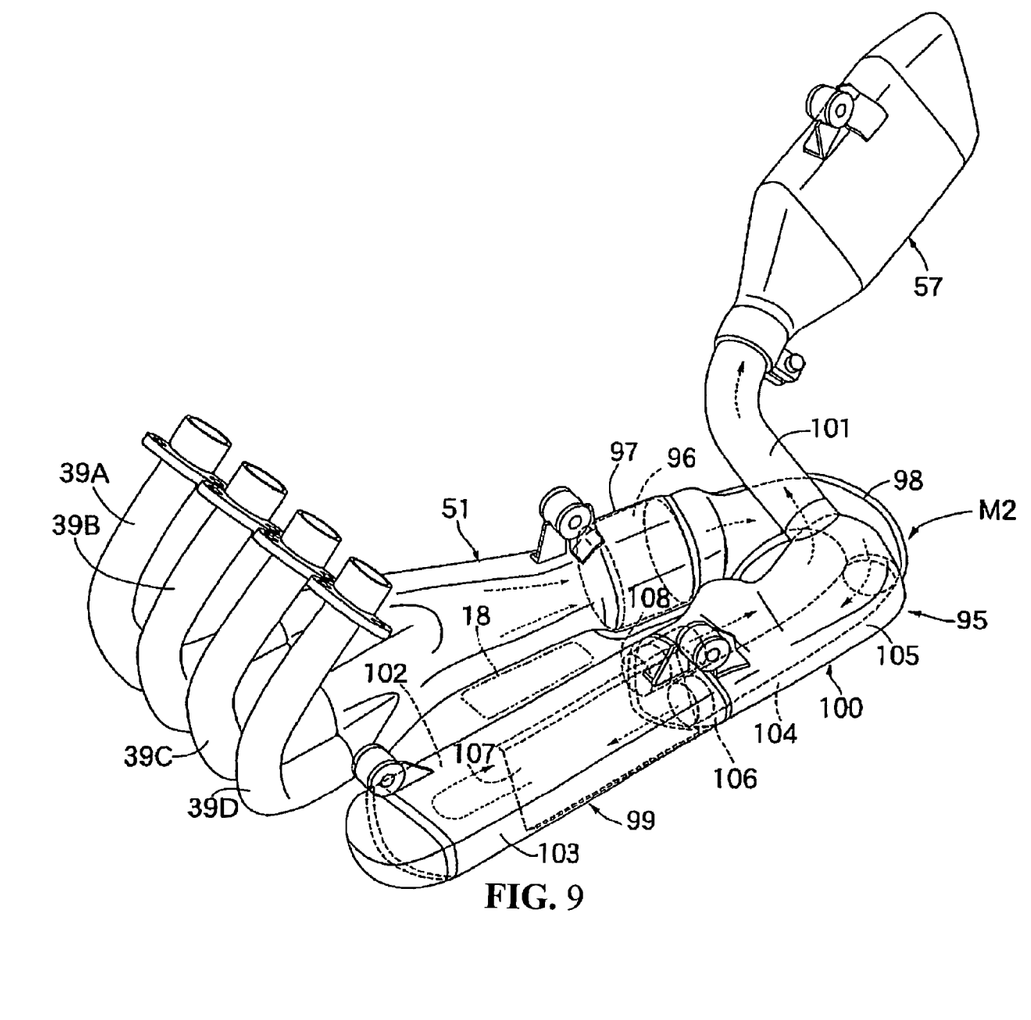
FIG. 9 is a perspective view of an exhaust device according to a second embodiment.

FIG. 9 shows a second embodiment. Parts corresponding to those in the first embodiment are designated by the same reference symbols and shown only in the figures, and their detailed description will be omitted.

An exhaust device 95 includes four exhaust pipes 39A to 39D, an assembly exhaust pipe 51, that is connected commonly to the downstream ends of those exhaust pipes 39A to 39D, a catalyst converter 97 including a catalyst 96 therein and having an upstream end connected to the downstream end of the assembly exhaust pipe 51, a first connecting pipe 98 having an upstream end connected to the downstream end of the catalyst converter 97, and a muffler M2 that is connected to the downstream end of the first connecting pipe 98. The muffler M2 has a first muffling portion 99 having a first expansion chamber 102, a second muffling portion 100 having a second expansion chamber 104, into which the exhaust gas is introduced from the first muffling portion 99, a second connecting pipe 101 that guides the exhaust gas from the second muffling portion 100, and a third muffling portion 57 having the third expansion chamber 79 (refer to FIG. 7 in the first embodiment) and having the upstream end connected to the downstream end of the second connecting pipe 101.

The respective exhaust pipes 39A to 39D, the assembly exhaust pipe 51, and the catalyst converter 97 are disposed on the right side of the oil pan 18. The first muffling portion 99 and the second muffling portion 100 are aligned anteroposteriorly with the first muffling portion 99 located at the anterior position, and are disposed on the left side of the oil pan 18. Moreover, a vessel body 103 of the first muffling portion 99 that constitutes the first expansion chamber 102 and a vessel body 105 of the second muffling portion 100 that constitutes the second expansion chamber 104 are mutually coupled so as to be aligned anteroposteriorly. An isolation plate 106, that isolates the first and second expansion chambers 102 and 104 from each other, is fixed onto any one of both the vessel bodies 103 and 105. Also, a separator 107, that separates the first expansion chamber 102 into right and left parts on a portion near the second expansion chamber 104, is fixed onto the vessel body 103 of the first muffling portion 99.

The first connecting pipe 98 is curved in a substantially U-shape on the rear side of the oil pan 18. The first connecting pipe 98 having the upstream end connected to the downstream end of the catalyst converter 97 has the downstream end communicating with the first expansion chamber 102 on the left side of the separator 107, and air-tightly penetrates the vessel body 105 and the isolation plate 106 of the second muffling portion 100. A conduit pipe 108 having one end opened to the first expansion chamber 102 on the right side of the separator 107 penetrates the isolation plate 106 and is fixed to the isolation plate 106. The other end of the conduit pipe 108 communicates with the second expansion chamber 104. In addition, the upstream end of the second connecting pipe 101 communicates with the second expansion chamber 104, and is connected to the vessel body 105 of the second muffling portion 100. A third muffling portion 57, that is disposed on the right side of the rear wheel WR (refer to the first embodiment), is connected with the downstream end of the second connecting pipe 101.

The exhaust device 95 according to the second embodiment is different from the exhaust device 40 according to the first embodiment in that the second expansion chamber 104 is disposed to the rear of the first expansion chamber 102 and to the rear of the engine main body 13. In addition, the catalyst converter 97 is arranged on the right side of the oil pan 18. However, the second embodiment has the same advantages as those of the first embodiment.

Since the catalyst converter 97 is disposed on the right side of the oil pan 18, the catalyst converter 97 can be efficiently arranged in a narrow space on the right side of the oil pan 18. Thus, the capacity of the muffler M2 can be sufficiently ensured as compared with a case where the catalyst converter is housed in the muffler.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust system for a motorcycle comprising:
respective exhaust pipes extending from respective cylinders of an engine; and
a muffler having a plurality of expansion chambers downstream of an assembly of the respective exhaust pipes;
wherein the muffler includes a first expansion chamber and a second expansion chamber that are connected in series with the first expansion chamber by a connecting pipe the respective exhaust pipes and the assembly are disposed at one of a left or right side of an oil pan of the engine, with the first expansion chamber being disposed at another of the left and right side of the oil pan, and
the second expansion chamber is disposed to a rear of the engine.

2. The exhaust system for a motorcycle according to claim 1, wherein the oil pan of the engine is evaginated downwardly, the respective exhaust pipes and the assembly are disposed on the one of the left or right side of the evaginated portion, and the first expansion chamber is disposed at the another of the left or right side of the evaginated portion.

3. The exhaust system for a motorcycle according to claim 1,
wherein a catalyst converter is disposed at the one of the left or right side of the oil pan.

4. The exhaust system for a motorcycle according to claim 1, wherein a catalyst converter is disposed at the one of the left or right side of the oil pan, the catalyst converter being formed separately from and rearwardly of the first expansion chamber.

5. The exhaust system for a motorcycle according to claim 1, wherein in order to ensure a banking angle when the motorcycle is banked to a side of the first expansion chamber, and in order to ensure the banking angle when the motorcycle is banked to a side of the exhaust pipes,
the first expansion chamber is substantially triangularly configured in section and disposed along a surface that is inclined obliquely upwardly and outwardly in a vehicle body front view, and the exhaust pipes are disposed along a surface that is inclined obliquely upwardly and outwardly in the vehicle body front view symmetrically with the first expansion chamber.

6. The exhaust system for a motorcycle according to claim 2, wherein in order to ensure a banking angle when the motorcycle is banked to a side of the first expansion chamber, and in order to ensure the banking angle when the motorcycle is banked to a side of the exhaust pipes,
the first expansion chamber is substantially triangularly configured in section and disposed along a surface that is inclined obliquely upwardly and outwardly in a vehicle body front view, and the exhaust pipes are disposed along a surface that is inclined obliquely upwardly and outwardly in the vehicle body front view symmetrically with the first expansion chamber.

7. The exhaust system for a motorcycle according to claim 1, wherein the first expansion chamber is disposed upstream of the second expansion chamber,
the first expansion chamber being disposed closer to a front of the engine than where the second expansion chamber is disposed.

8. An exhaust system for a motorcycle in which an engine main body of a multi-cylinder engine includes an oil pan on a lower portion thereof mounted on a vehicle body and a muffler including a plurality of expansion chambers being connected to a downstream side of an assembled portion of a plurality of exhaust pipes that extend outwardly of the respective cylinders of the engine main body comprising:
a first expansion chamber connected to the assembled portion, and the other expansion chambers that are continuous to the first expansion chamber with respective exhaust pipes and the assembled portion being disposed on one of a left or right side of the oil pan;

the first expansion chamber being disposed on the other of the left or right side of the oil pan; and a second expansion chamber being disposed to a rear of the engine main body.

9. The exhaust system for a motorcycle according to claim 8, wherein the oil pan has an evaginated portion that is evaginated downwardly on a lower portion thereof;

the respective exhaust pipes and the assembled portion are disposed at the one of the left or right side of the evaginated portion; and the first expansion chamber is disposed at the other of the left or right side of the evaginated portion.

10. The exhaust system for a motorcycle according to claim 9, wherein one side surface of the evaginated portion is inclined so as to be positioned inwardly along a width direction of the motorcycle toward a lower side;

the other side surface of the evaginated portion includes a side plate portion that is substantially orthogonal to a bottom surface of the oil pan and extends vertically and a seam portion that extends from an upper end of the side plate portion towards an outer side so as to be substantially L-shaped; and the exhaust pipes that are disposed on the outer side of the one side surface are connected to the first expansion chamber that is disposed on the outer side of the other side surface so as to position at least a part of the first expansion chamber on the lower side of the seam portion from a rear side of the oil pan.

11. The exhaust system for a motorcycle according to claim 8, wherein a catalyst converter is disposed on the one of the left or right side of the oil pan.

12. The exhaust system for a motorcycle according to claim 9, wherein a catalyst converter is disposed on the one of the left or right side of the oil pan.

13. The exhaust system for a motorcycle according to claim 8, wherein a catalyst converter is disposed on the one of the left or right side of the oil pan, the catalyst converter being formed separately from and rearwardly of the first expansion chamber.

14. The exhaust system for a motorcycle according to claim 8, wherein in order to ensure a banking angle when the motorcycle is banked to a side of the first expansion chamber, and in order to ensure the banking angle when the motorcycle is banked to a side of the plurality of exhaust pipes, a vessel body that constitutes the first expansion chamber is substantially triangularly shaped in cross-section and is disposed along a surface that is inclined obliquely upwardly toward an outer side in a vehicle front view; and the plurality of exhaust pipes are disposed along a surface that is inclined obliquely upwardly towards the outer side in the vehicle front view, as opposed to the vessel body.

15. The exhaust system for a motorcycle according to claim 8, wherein the first expansion chamber is disposed upstream of the second expansion chamber, the first expansion chamber being disposed closer to a front of the engine than where the second expansion chamber is disposed.

16. An exhaust system for a motorcycle wherein an engine main body of a multi-cylinder engine has an oil pan on a lower portion thereof that is mounted on a vehicle body and a muffler includes a plurality of expansion chambers connected to a downstream side of an assembled portion of a plurality of exhaust pipes that extend out of the respective cylinders of the engine main body comprising:

said muffler including a first expansion chamber operatively connected to the assembled portion and the other expansion chambers that are continuous to the first expansion chamber, wherein the respective exhaust pipes and the assembled portion are disposed on one of a left or right side of the oil pan;

said first expansion chamber being disposed on the other of the left or right side of the oil pan; and the other expansion chambers being disposed in a rear of the engine main body.

17. The exhaust system for a motorcycle according to claim 16, wherein the oil pan has an evaginated portion that is evaginated downwardly on a lower portion thereof;

the respective exhaust pipes and the assembled portion are disposed at the one of the left or right side of the evaginated portion; and the first expansion chamber is disposed at the other of the left or right side of the evaginated portion.

18. The exhaust system for a motorcycle according to claim 17, wherein one side surface of the evaginated portion is inclined so as to be positioned inwardly along a width direction of the motorcycle toward a lower side;

the other side surface of the evaginated portion includes a side plate portion that is substantially orthogonal to a bottom surface of the oil pan and extends vertically with a seam portion that extends from an upper end of the side plate portion towards an outer side so as to be substantially L-shaped; and the exhaust pipes, that are disposed on the outer side of the one side surface, are connected to the first expansion chamber that is disposed on the outer side of the other side surface so as to position at least a part of the first expansion chamber on the lower side of the seam portion from a rear side of the oil pan.

19. The exhaust system for a motorcycle according to claim 16, wherein a catalyst converter is disposed on the one of the left or right side of the oil pan.

20. The exhaust system for a motorcycle according to claims 16, wherein in order to ensure a banking angle when the motorcycle is banked to a side of the first expansion chamber, and in order to ensure the banking angle when the motorcycle is banked to a side of the plurality of exhaust pipes, a vessel body that constitutes the first expansion chamber is substantially triangularly shaped in cross-section and disposed along a surface that is inclined obliquely upwardly toward an outer side in a vehicle front view; and the plurality of exhaust pipes are disposed along a surface that is inclined obliquely upwardly toward the outer side in the vehicle front view, as opposed to the vessel body.

* * * * *